United States Patent
Comstock

(10) Patent No.: US 11,589,392 B2
(45) Date of Patent: Feb. 21, 2023

(54) METHODS FOR TRIGGERING A BASE STATION TO TRANSMIT A MAC MESSAGE

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 174 days.

(21) Appl. No.: 17/108,759

(22) Filed: Dec. 1, 2020

(65) Prior Publication Data

US 2021/0084692 A1 Mar. 18, 2021

Related U.S. Application Data

(63) Continuation of application No. 16/347,103, filed as application No. PCT/US2017/059838 on Nov. 3, 2017, now Pat. No. 10,887,923.

(Continued)

(51) Int. Cl.
| | |
|---|---|
| *H04L 12/28* | (2006.01) |
| *H04W 74/08* | (2009.01) |
| *H04W 76/20* | (2018.01) |
| *H04L 5/00* | (2006.01) |
| *H04W 36/00* | (2009.01) |

(Continued)

(52) U.S. Cl.
CPC .......... *H04W 74/0833* (2013.01); *H04L 5/00* (2013.01); *H04L 5/001* (2013.01); *H04W 36/0069* (2018.08); *H04W 74/08* (2013.01); *H04W 76/20* (2018.02); *H04L 5/0048* (2013.01); *H04L 5/0053* (2013.01); *H04W 16/32* (2013.01)

(58) Field of Classification Search
CPC ......... H04W 36/0016; H04W 36/0077; H04W 36/08; H04W 36/0018
USPC .......... 370/252, 331, 329, 386, 336
See application file for complete search history.

(56) References Cited

U.S. PATENT DOCUMENTS

| | | | |
|---|---|---|---|
| 10,736,009 B2 * | 8/2020 | Xu ........................ | H04W 76/10 |
| 11,057,814 B2 * | 7/2021 | Zhang ............... | H04W 36/0022 |

(Continued)

FOREIGN PATENT DOCUMENTS

| | | |
|---|---|---|
| JP | 201658784 A | 4/2016 |
| WO | 2016021821 A1 | 2/2016 |

OTHER PUBLICATIONS

CMCC; "New MAC Functions in NR"; R2-167075, 3GPP TSG-RAN WG2 #95bis; Oct. 1, 2016; Kaohsiung, TW.

(Continued)

*Primary Examiner* — John Pezzlo

(57) ABSTRACT

The examples described herein provide for a Secondary Base Station (SeNB) Change procedure in a system configured to provide Dual Connectivity, where the SeNB Change procedure does not include the RACH procedure. As part of the SeNB Change procedure, a UE device generates a request that the Target Secondary base station (Target SeNB) is to send a Media Access Control (MAC) message to the UE device. In some examples, the request can be configured to specify a particular MAC Control Element that the Target SeNB should send in response to receiving the request. Upon receipt of the request, the Target SeNB transmits the requested MAC message to the UE device, along with TA information, if required. The UE device determines when the SeNB Change procedure has been completed, based at least partially on when the requested MAC message is received from the Target SeNB.

6 Claims, 4 Drawing Sheets

Related U.S. Application Data

(60) Provisional application No. 62/417,507, filed on Nov. 4, 2016.

(51) Int. Cl.
    *H04J 1/16* (2006.01)
    *H04W 16/32* (2009.01)

(56) References Cited

U.S. PATENT DOCUMENTS

| | | | |
|---|---|---|---|
| 11,147,111 B2 * | 10/2021 | Xu | H04W 36/0058 |
| 2013/0343307 A1 | 12/2013 | Desai et al. | |
| 2015/0173047 A1 | 6/2015 | Yamada | |
| 2016/0242092 A1 * | 8/2016 | Rosa | H04W 36/0069 |
| 2017/0222876 A1 | 8/2017 | Van Der et al. | |

OTHER PUBLICATIONS

Huawei, Hsilicon;"RACH-less Handover for Mobility Enhancement"; R2-162410, 3GPP TSG-RAN WG2 #93bis; Apr. 2, 2016; Dubronik, HR.

ZTE, Intel, China Telecom, Samsung; "NEW WID: Further mobility enhancements in LTE", RP-160636; 3GPP TSG RAN Meeting #71, Mar. 7-10, 2016; Gothenburg, SE.

* cited by examiner

METHODS FOR TRIGGERING A BASE STATION TO TRANSMIT A MAC MESSAGE

CLAIM OF PRIORITY

The present application is a continuation of U.S. application Ser. No. 16/347,103, filed May 2, 2019 and entitled "METHODS FOR TRIGGERING A BASE STATION TO TRANSMIT A MAC MESSAGE"; which is a national stage application of PCT/US2017/059838, filed Nov. 3, 2017 and entitled "METHODS FOR TRIGGERING A BASE STATION TO TRANSMIT A MAC MESSAGE"; which claims priority to Provisional Application No. 62/417,507, entitled "METHODS FOR TRIGGERING AN ENB TO TRANSMIT A MAC MESSAGE"; filed Nov. 4, 2016, all of which are assigned to the assignee hereof, and hereby expressly incorporated by reference.

FIELD

This invention generally relates to wireless communications and more particularly to user equipment devices requesting messages from base stations.

BACKGROUND

In conventional systems, a handover of a user equipment (UE) device from a source base station (e.g., source eNB) to a target base station (e.g., target eNB) involves the source base station transmitting a Handover Request message to the target base station (e.g., to initiate a handover) and the target base station transmitting a message in response. The source base station signals target base station uplink resources to the UE device, which utilizes the uplink resources for a Random-Access Channel (RACH) procedure. After the UE device is handed over to the target base station, the UE device transmits an uplink signal to the target base station as part of the RACH procedure. The target base station uses the uplink signal received from the UE device to calculate a Timing Advance (TA), which is needed in order for the UE device's uplink transmissions to be synchronized to the target base station after handover. The target base station signals the TA in the Random Access Response (RAR) message, along with uplink resources needed for the UE device to obtain uplink access to the target base station as part of the handover procedure. The UE device determines when the handover procedure is completed for the UE device, based upon when the UE device receives the RAR message. In conventional systems configured to provide Dual Connectivity, a Secondary Base Station (SeNB) Change of a UE device from a source SeNB to a target SeNB makes use of a similar RACH procedure.

SUMMARY

The examples described herein provide for a Secondary Base Station (SeNB) Change procedure in a system configured to provide Dual Connectivity, where the SeNB Change procedure does not include the RACH procedure. As part of the SeNB Change procedure, a UE device generates a request that the Target Secondary base station (Target SeNB) is to send a Media Access Control (MAC) message to the UE device. In some examples, the request can be configured to specify a particular MAC Control Element that the Target SeNB should send in response to receiving the request. Upon receipt of the request, the Target SeNB transmits the requested MAC message to the UE device, along with TA information, if required. The UE device determines when the SeNB Change procedure has been completed based at least partially on when the requested MAC message is received from the Target SeNB.

DETAILED DESCRIPTION

Figure 1:
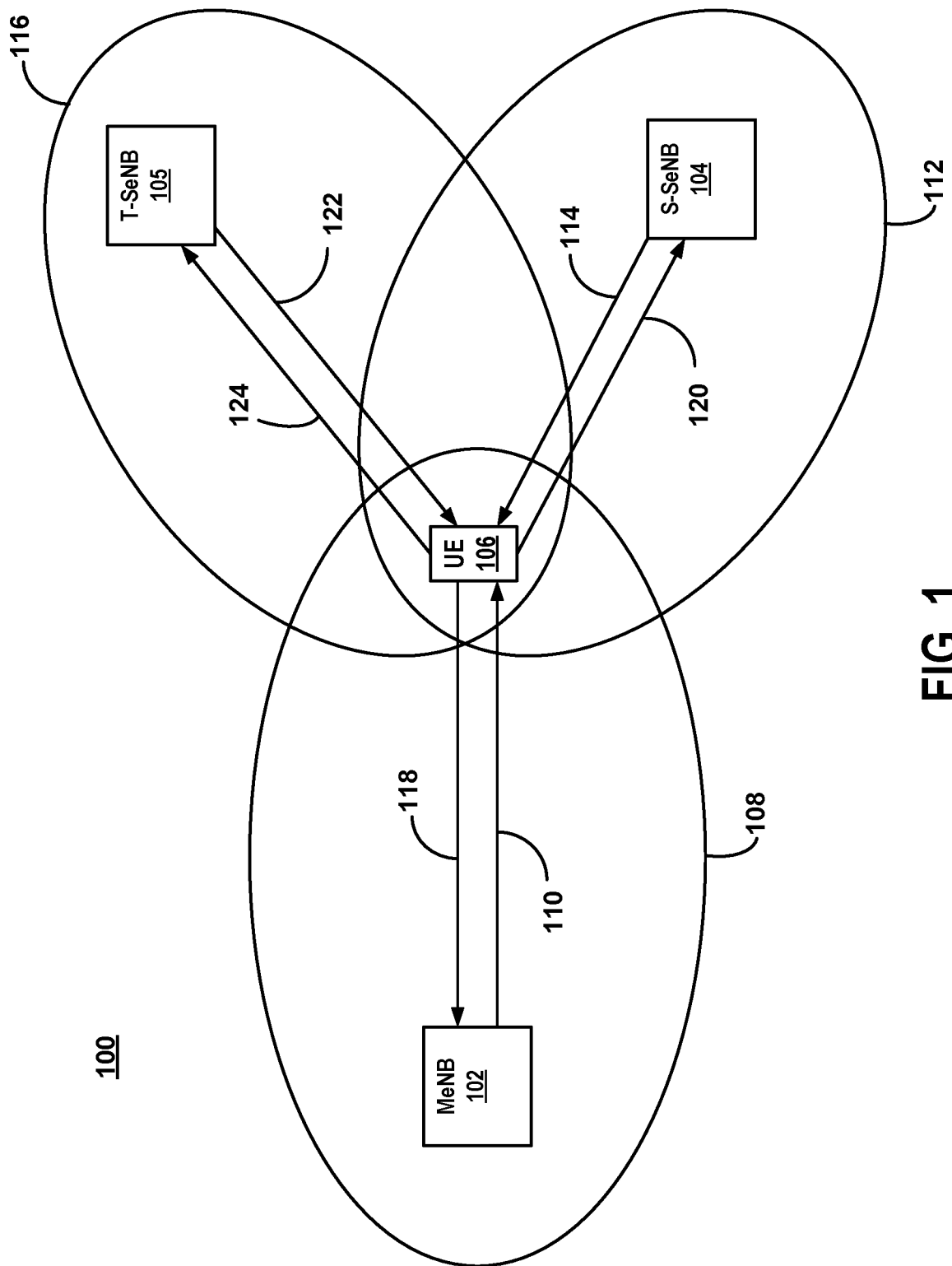
FIG. 1 is a block diagram of a communication system for an example in which a UE device requests that a target secondary base station transmits a MAC message to the UE device.

The Timing Advance (TA) provided by a target base station to a UE device during a handover in conventional systems is needed in order for the UE device's uplink transmissions to be synchronized to the target base station after handover. If the uplink transmissions are not properly synchronized to the target base station, the target base station will not be able to detect and decode the transmissions. However, one drawback of conventional systems is that the TA determination step increases the amount of time required to complete the handover procedure in examples when the TA may not need to be determined during a handover.

RACH-less handovers can be used in examples when the TA does not need to be determined during a handover, in order to reduce the time required to complete the handover procedure. As used herein, the term "RACH-less handover" refers to skipping the transmission of the Random-Access Channel (RACH) by the user equipment (UE) device to the target base station (e.g., target eNB) during handover, which significantly improves the delay for the handover procedure since the RACH procedure is a substantial part of the handover delay. However, if the RACH procedure is not performed, any alternative method must provide a way for the UE device to be able to determine when a handover of the UE device has been successfully completed, which is determined by receiving the RAR message in conventional systems.

Besides the foregoing requirements, a RACH-less handover procedure performed in a 3rd Generation Partnership Project Long Term Evolution (3GPP LTE) system that is configured to provide Dual Connectivity to UE devices requires similar considerations. For example, Dual Connectivity (DC) allows UE devices to exchange data simultaneously from different base stations, also referred to as eNodeBs (eNBs), in order to boost the performance in a heterogeneous network with dedicated carrier deployment. Dual Connectivity in an LTE network can significantly improve per-user throughput and mobility robustness by allowing users to be connected simultaneously to a master cell group (MCG) and a secondary cell group (SCG) via a Master eNB (MeNB) and Secondary eNB (SeNB), respectively. In such a system, as a UE device moves or radio conditions change, the UE device may maintain a primary connection with the same MeNB but may have a secondary connection that is handed over from a first SeNB (e.g., Source SeNB) to a second SeNB (e.g., Target SeNB). This type of handover in a system that provides Dual Connectivity is known as a Secondary base station (SeNB) Change procedure.

The examples described herein illustrate various techniques for performing RACH-less SeNB Change procedures. For example, the MeNB transmits an uplink grant to the UE device in a Radio Resource Control (RRC) Connection Reconfiguration message. The uplink grant provides the resources for the UE device to transmit an uplink transmission to a Target SeNB. Upon receipt of the RRC Connection Reconfiguration message from the Master eNB, the UE device generates a request that the Target SeNB is to send a MAC message to the UE device. The UE device transmits the request using the uplink grant received in the RRC Connection Reconfiguration message.

Upon receipt of the request, the Target SeNB transmits the requested MAC message to the UE device, along with TA information, if required. The UE device determines when the SeNB Change procedure has been completed, based at least partially on when the requested MAC message is received from the Target SeNB. Any unnecessary information received in the MAC message may be discarded by the UE device.

FIG. 1 is a block diagram of a communication system for an example in which a UE device requests that a target secondary base station (Target SeNB) transmits a MAC message to the UE device. The communication system 100 is part of a radio access network (not shown) that provides various wireless services to UE devices that are located within the respective service areas of the various base stations that are part of the radio access network.

In the interest of clarity and brevity, communication system 100 is shown as having only one Master base station (MeNB) 102 and only two Secondary base stations (SeNBs) 104, 105. However, in other examples, communication system 100 could have any suitable number of Master base stations and Secondary base stations. In the example of FIG. 1, at least a portion of the service area (cell) for Master base station 102 is represented by cell 108. At least a portion of the respective service areas (cells) for Secondary base stations 104, 105 are represented by cells 112, 116. Cells 108, 112, 116 are represented by ovals, but a typical communication system 100 would have a plurality of cells, each having variously shaped geographical service areas. Moreover, although cell 108 is shown as only partially overlapping cells 112, 116 in the example of FIG. 1, one, or both, of cells 112, 116 may be located entirely within cell 108, in other examples.

Base stations 102, 104, 105, sometimes referred to as eNodeBs or eNBs, communicate with the wireless user equipment (UE) device 106 by respectively transmitting downlink signals 110, 114, 122 when connected to UE device 106. Base stations 102, 104, 105 respectively receive uplink signals 118, 120, 124 transmitted from the UE device 106 when connected to UE device 106. The UE device 106 is any wireless communication device such as a mobile phone, a transceiver modem, a personal digital assistant (PDA), a tablet, or a smartphone, for example.

Figure 2A:
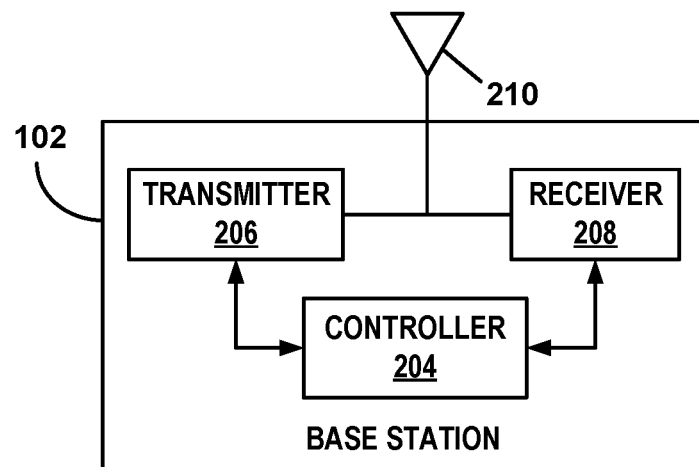
FIG. 2A is a block diagram of an example of the base stations shown in FIG.

Base stations 102, 104, 105 are connected to the network through a backhaul (not shown) in accordance with known techniques. As shown in FIG. 2A, Master base station 102 comprises controller 204, transmitter 206, and receiver 208, as well as other electronics, hardware, and code. Although FIG. 2A specifically depicts the circuitry and configuration of Master base station 102, the same base station circuitry and configuration that is shown and described in connection with Master base station 102 is also utilized for Secondary base stations 104, 105, in the example shown in FIG. 1. In other examples, one, or both, of the Secondary base stations 104, 105 may have circuitry and/or a configuration that differs from that of the Master base station 102.

The Master base station 102 is any fixed, mobile, or portable equipment that performs the functions described herein. The various functions and operations of the blocks described with reference to the Master base station 102 may be implemented in any number of devices, circuits, or elements. Two or more of the functional blocks may be integrated in a single device, and the functions described as performed in any single device may be implemented over several devices.

For the example shown in FIG. 2A, the Master base station 102 may be a fixed device or apparatus that is installed at a particular location at the time of system deployment. Examples of such equipment include fixed base stations or fixed transceiver stations. In some situations, the Master base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the Master base station 102 may be a portable device that is not fixed to any particular location. Accordingly, the Master base station 102 may be a portable user device such as a UE device in some circumstances.

The controller 204 includes any combination of hardware, software, and/or firmware for executing the functions described herein as well as facilitating the overall functionality of the Master base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 110 and can apply any one of a plurality of modulation orders. The demodulator demodulates any uplink signals 118 received at the Master base station 102 in accordance with one of a plurality of modulation orders.

Figure 2B:
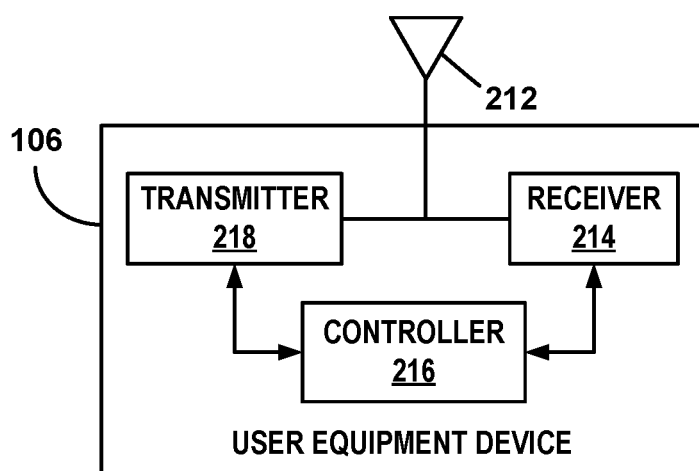
FIG. 2B is a block diagram of an example of the UE device shown in FIG. 1.

Returning to FIG. 1, the communication system 100 provides various wireless services to UE device 106 via base stations 102, 104, 105. For the examples herein, the communication system 100 operates in accordance with at least one revision of the 3rd Generation Partnership Project Long Term Evolution (3GPP LTE) communication specification. UE device 106 is initially served by Master base station 102 and by Source SeNB (S-SeNB) 104. Thus, UE device 106 receives downlink signals 110, 114 via antenna 212 and receiver 214, as shown in FIG. 2B. Besides antenna 212 and receiver 214, UE device 106 further comprises controller 216 and transmitter 218, as well as other electronics, hardware, and code. UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 118, 120, 124 which are shown in FIG. 1. The demodulator demodulates the downlink signals 110, 114, 122 in accordance with one of a plurality of modulation orders.

At the beginning of operation of the example shown in FIG. 1, the UE device 106 is being served by Master base station 102 and Source SeNB 104. Thus, upon receipt of the downlink signals 110, 114, the UE device 106 demodulates the downlink signals 110, 114, which yields encoded data packets that contain data pertaining to at least one of the wireless services that the Master base station 102 and the Source SeNB 104 are providing to the UE device 106. The UE device 106 decodes the encoded data packets, using controller 216, to obtain the data.

When the Secondary base station (SeNB) Change procedure criteria are met, the SeNB Change procedure is initiated. The SeNB Change procedure criteria may include, for example, radio congestion at Source SeNB 104, poor/deteriorating signal quality for the uplink/downlink signals for UE device 106, and/or underutilization of available resources by Target SeNB 105. However, any other suitable criteria could be used. As mentioned above, when performing the SeNB Change procedure, the UE device 106 maintains its primary connection with the Master base station 102 but hands over its secondary connection from the Source SeNB 104 to the Target SeNB 105.

Figure 3A:
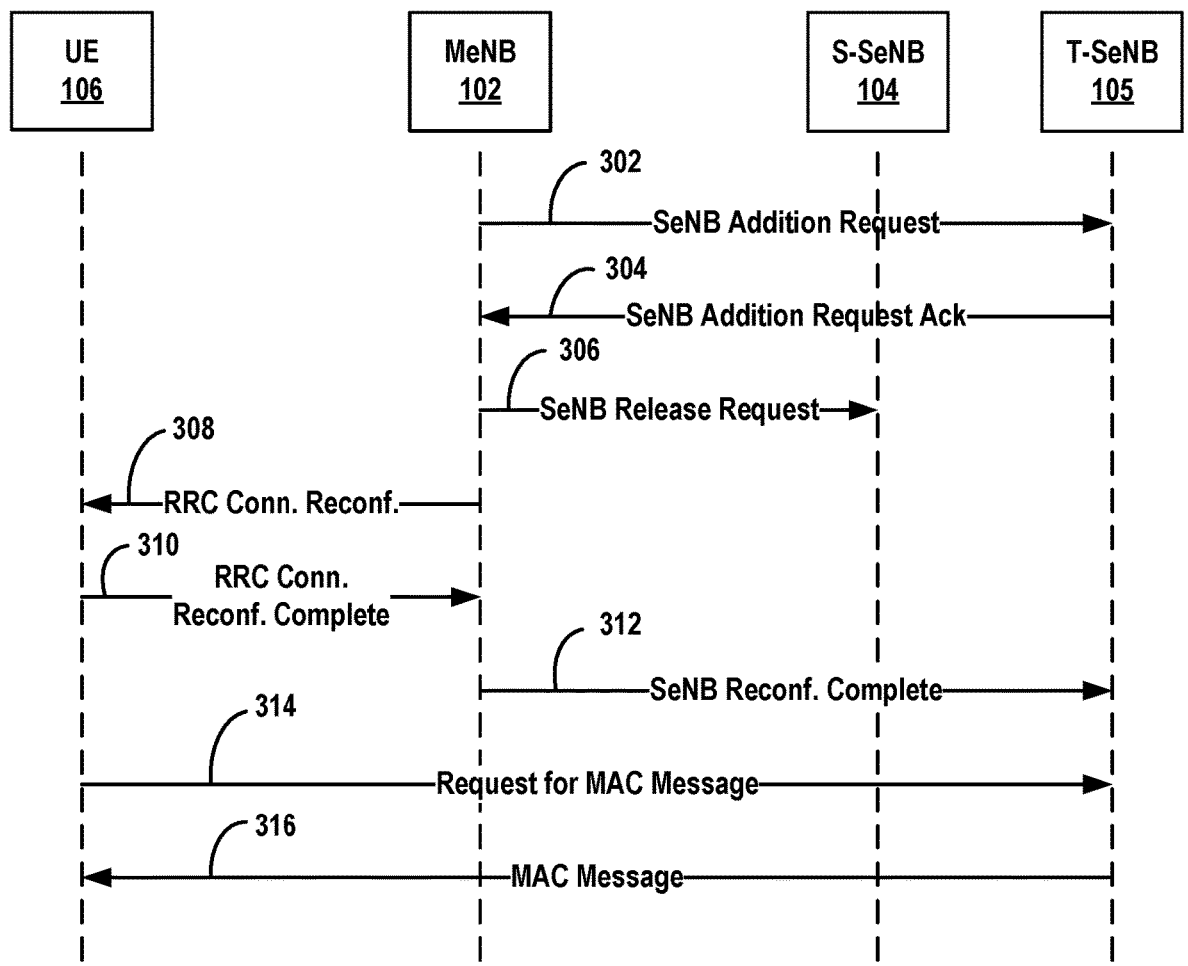
FIG. 3A is a messaging diagram of an example of the messages exchanged between the various system components shown in FIG. 1.

To initiate the SeNB Change procedure, the Master base station 102 transmits an SeNB Addition Request to Target SeNB 105 via a wired (e.g., X2) or a wireless communication link. If the transmission is wireless, Master base station 102 uses transmitter 206 and antenna 210 to transmit the SeNB Addition Request, and Target SeNB 105 receives the wireless transmission of the SeNB Addition Request via its antenna 210 and receiver 208. The transmission of the SeNB Addition Request to the Target SeNB 105 is represented in FIG. 3A by signal 302.

If the Target SeNB 105 agrees to serve as the SeNB for UE device 106, the Target SeNB 105 sends an SeNB Addition Request Acknowledgement message to the Master base station 102 via a wired connection or a wireless connection. The transmission of the SeNB Addition Request Acknowledgement is represented in FIG. 3A by signal 304. Upon receipt of the SeNB Addition Request Acknowledgement, the Master base station 102 transmits an SeNB Release Request to Source SeNB 104 via a wired (e.g., X2) or a wireless communication link, which informs the Source SeNB 104 that the secondary connection of the UE device 106 is being handed over to Target SeNB 105. The transmission of the SeNB Release Request message is represented in FIG. 3A by signal 306.

The Master base station 102 transmits a Radio Resource Control (RRC) Connection Reconfiguration message to the UE device 106. The RRC Connection Reconfiguration message includes uplink grant information, which the UE device 106 will utilize to send a request that the Target SeNB 105 transmits a Media Access Control (MAC) message to the UE device 106. The RRC Connection Reconfiguration message may also include information that is used by the UE device 106 to detect and decode the MAC message that the Target SeNB 105 will send to the UE device 106. The RRC Connection Reconfiguration message may also include information regarding the length of a window during which the UE device 106 should monitor the Physical Downlink Control Channel (PDCCH) for a RAR message that will be sent by the Target SeNB 105. The transmission of the RRC Connection Reconfiguration message is represented in FIG. 3A by signal 308.

Once the RRC Connection is reconfigured, the UE device 106 transmits an RRC Connection Reconfiguration Complete message to the Master base station 102. The RRC Connection Reconfiguration Complete message is represented in FIG. 3A by signal 310. Upon receipt of the RRC Connection Reconfiguration Complete message, the Master base station 102 transmits an SeNB Reconfiguration Complete message to Target SeNB 105 to inform Target SeNB 105 that (1) UE device 106 has been reconfigured to switch its secondary connection from Source SeNB 104 to Target SeNB 105, and (2) Target SeNB 105 should be prepared to receive an uplink transmission from UE device 106. The SeNB Reconfiguration Complete message is represented in FIG. 3A by signal 312.

Figure 3B:
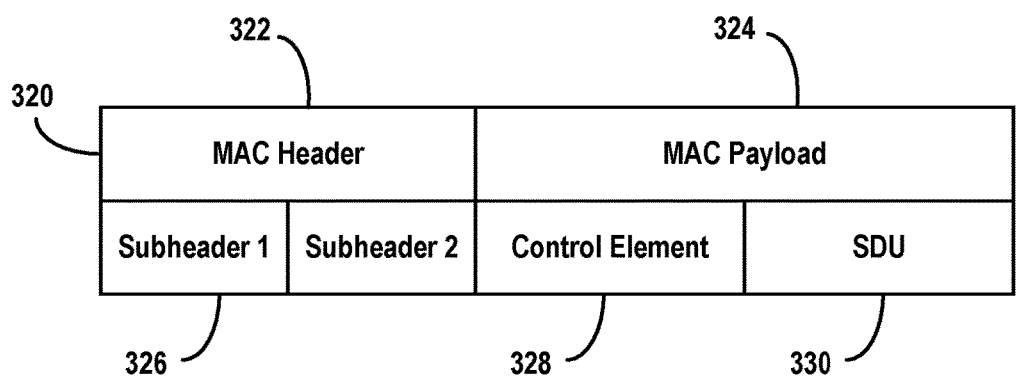
FIG. 3B is a block diagram of an example of a MAC Protocol Data Unit structure.

Upon receipt of the RRC Connection Reconfiguration message, the UE device 106 generates a request that the Target SeNB 105 transmits a MAC message to the UE device 106. In some examples, the request comprises a Logical Channel Identifier (LCID) located in a subheader of a MAC Protocol Data Unit (PDU) that will be transmitted to the Target SeNB 105. FIG. 3B shows an example of a MAC PDU structure 320, which comprises a MAC header 322 and a MAC payload 324. The MAC header 322 comprises one or more subheaders 326 that identify the type of information contained in the MAC payload 324. There is a subheader 326 associated with each entry in the MAC payload 324. As can be seen in FIG. 3B, the first part of the MAC payload 324 contains one or more MAC Control Elements 328 that are followed by one or more MAC Service Data Units (SDUs) 330. The MAC SDUs include control data, such as an RRC message, and user data. For the example shown in FIG. 3B, subheader 1 is associated with MAC Control Element 328, and subheader 2 is associated with MAC SDU 330.

In some examples, the LCID, itself, is defined to request that the Target SeNB 105 transmits a specific MAC Control Element, such as a UE Contention Resolution Identity MAC Control Element, to the UE device 106. For these examples, only the LCID located in a subheader (e.g., subheader 1) is used to request a specific MAC Control Element or other MAC message, and no payload information is needed for the request. In other examples, the request is that the Target SeNB 105 is to transmit a Random Access Response (RAR) message to the UE device 106.

Alternatively, the LCID can be a generic MAC Command Request, indicating that a MAC Control Element located in the MAC payload 324 identifies the requested command. For example, the LCID, which is included in a subheader 326 of the MAC PDU 320, is set to the MAC Command Request value, and the specific MAC Control Element or MAC message being requested (e.g., UE Contention Resolution Identity or RAR) is identified by a value located in a MAC SDU 330 that corresponds with the subheader that contains the MAC Command Request LCID.

In some examples, any MAC message transmitted to the Target SeNB 105 using the uplink grant information received in the RRC Connection Reconfiguration message of the SeNB Change procedure is a request that the Target SeNB 105 transmits a MAC message to the UE device 106. In some examples, receiving the SeNB Reconfiguration Complete message is a request that the Target SeNB 105 transmits a MAC message to the UE device 106.

For the examples described herein, MAC messages contain control information that originates and terminates in peer MAC layer (Layer 2) protocol entities, such as specified in the 3rd Generation Partnership Project Long Term Evolution (3GPP LTE) MAC specification, for example, and includes MAC messages, such as the Random Access Response (RAR) message, as well as MAC Control Elements.

Regardless of the format of the request that the Target SeNB 105 is to transmit a MAC message, the UE device 106 transmits, via transmitter 218 and antenna 212, the request to the Target SeNB 105 in an uplink transmission 124. In these examples, the transmission of the request to the Target SeNB 105 is represented in FIG. 3A by signal 314.

The Target SeNB 105 receives the request via antenna 210 and receiver 208. Upon receipt of the request, the Target SeNB 105 utilizes controller 204 to generate a MAC message in accordance with the received request. More specifically, in some examples, the Target SeNB 105 generates a MAC message that contains the specific MAC Control Element indicated in the request from the UE device 106.

For example, if the request was for a UE Contention Resolution Identity MAC Control Element, then the Target SeNB 105 would generate a MAC message containing a UE Contention Resolution Identity MAC Control Element. Likewise, if the request was for a RAR, then the Target SeNB 105 would generate a MAC message containing a RAR.

The Target SeNB 105 transmits, via transmitter 206 and antenna 210, the MAC message containing the requested MAC message (e.g., a UE Contention Resolution Identity MAC Control Element or a RAR) to the UE device 106. The transmission of the MAC message is represented in FIG. 3A by signal 316.

After transmission of the request, the UE device 106 monitors the Physical Downlink Control Channel (PDCCH) to receive the MAC transmission that is sent by the Target SeNB 105 in response to the request. In an embodiment where the request was for a Random Access (RA) Response, the UE device 106 monitors the PDCCH during a PDCCH Random Access (RA) Response window that has a size that is obtained from System Information or from Mobility Control Information contained in the RRC Connection Reconfiguration message. In some examples, the PDCCH RA Response window starts at a subframe in which the request was transmitted to the Target SeNB 105 or at a point relative to a subframe in which the request was transmitted to the Target SeNB 105. For example, the PDCCH RA Response window can be configured to start at the subframe that contains the end of the request (e.g., MAC message) transmitted by the UE device 106 or at the subframe that contains the end of the request (e.g., MAC message) transmitted by the UE device 106 plus three subframes. In other examples, the PDCCH RA Response window starts at a subframe value included in Random Access Channel (RACH) parameters provided by the Target SeNB 105 or at the subframe value included in the RACH parameters provided by the Target SeNB 105 plus three subframes. The three additional subframes referenced in the foregoing examples are based on current LTE specifications. However, any other suitable subframe offsets (e.g., a different number of additional subframes) may be used.

For the UE device 106 to receive the RAR message via antenna 212 and receiver 214 during the PDCCH RA Response window, the UE device 106 utilizes controller 216 to determine a Random Access Radio Network Temporary Identifier (RA-RNTI) using a subframe index associated with a subframe in which the request was transmitted by the UE device 106. In other examples, the UE device 106 utilizes controller 216 to determine the RA-RNTI using a subframe index associated with a subframe value included in Random Access Channel (RACH) parameters provided by the Target SeNB 105. Regardless of the method used to determine the RA-RNTI, the RA-RNTI indicates which UE device is the target of the RAR message transmitted by the Target SeNB 105. Thus, the UE device 106 utilizes the RA-RNTI to confirm that the received RAR message is, in fact, intended for the UE device 106.

In an embodiment where the request was for a MAC message or a MAC Control Element, the UE device 106 monitors the PDCCH to receive a downlink assignment on the Physical Downlink Shared Channel (PDSCH) that contains the MAC message.

Based at least partially upon when the UE device 106 receives the requested MAC message, the UE device 106 uses controller 216 to determine when the SeNB Change procedure (e.g., from Source SeNB 104 to Target SeNB 105) is completed for the UE device 106.

FIG. 3A is a messaging diagram of an example of the messages exchanged between the various system components shown in FIG. 1. In this example, the Master base station 102 transmits an SeNB Addition Request to Target SeNB 105, via signal 302. In response, Target SeNB 105 transmits an SeNB Addition Request Acknowledgement to the Master base station 102 via signal 304. Upon receipt of the SeNB Addition Request Acknowledgement, the Master base station 102 transmits an SeNB Release Request to the Source SeNB 104 via signal 306.

The Master base station 102 transmits an RRC Connection Reconfiguration message to the UE device 106, which is represented by signal 308. As mentioned above, the RRC Connection Reconfiguration message may contain (1) uplink grant information required by the UE device 106, (2) information that is used by the UE device 106 to detect and decode the MAC message that the Target SeNB 105 will send to the UE device 106, and (3) information regarding the length of a window during which the UE device 106 should monitor the Physical Downlink Control Channel (PDCCH) for a RAR message that will be sent by the Target SeNB 105.

Once the RRC Connection is reconfigured, the UE device 106 transmits an RRC Connection Reconfiguration Complete message to the Master base station 102 via signal 310. Upon receipt of the RRC Connection Reconfiguration Complete message, the Master base station 102 transmits an SeNB Reconfiguration Complete message to Target SeNB 105 to inform Target SeNB 105 that (1) UE device 106 has been reconfigured to switch its secondary connection from Source SeNB 104 to Target SeNB 105, and (2) Target SeNB 105 should be prepared to receive an uplink transmission from UE device 106. The SeNB Reconfiguration Complete message is represented in by signal 312.

Upon receipt of the RRC Connection Reconfiguration message, the UE device 106 generates a request that the Target SeNB 105 is to transmit a MAC message to the UE device 106, as discussed above. The UE device 106 transmits the request to the Target SeNB 105 in an uplink transmission 124. The transmission of the request to the Target SeNB 105 is represented by signal 314.

Upon receipt of the request, the Target SeNB 105 generates the specific MAC message indicated in the request from the UE device 106. The Target SeNB 105 transmits the requested MAC message (e.g., a UE Contention Resolution Identity MAC Control Element or a RAR) to the UE device 106. The transmission of the MAC message is represented by signal 316. In some examples, the MAC message also contains the TA information needed for the UE device 106 to synchronize its uplink transmissions to the Target SeNB after the SeNB Change procedure is complete.

Figure 4:
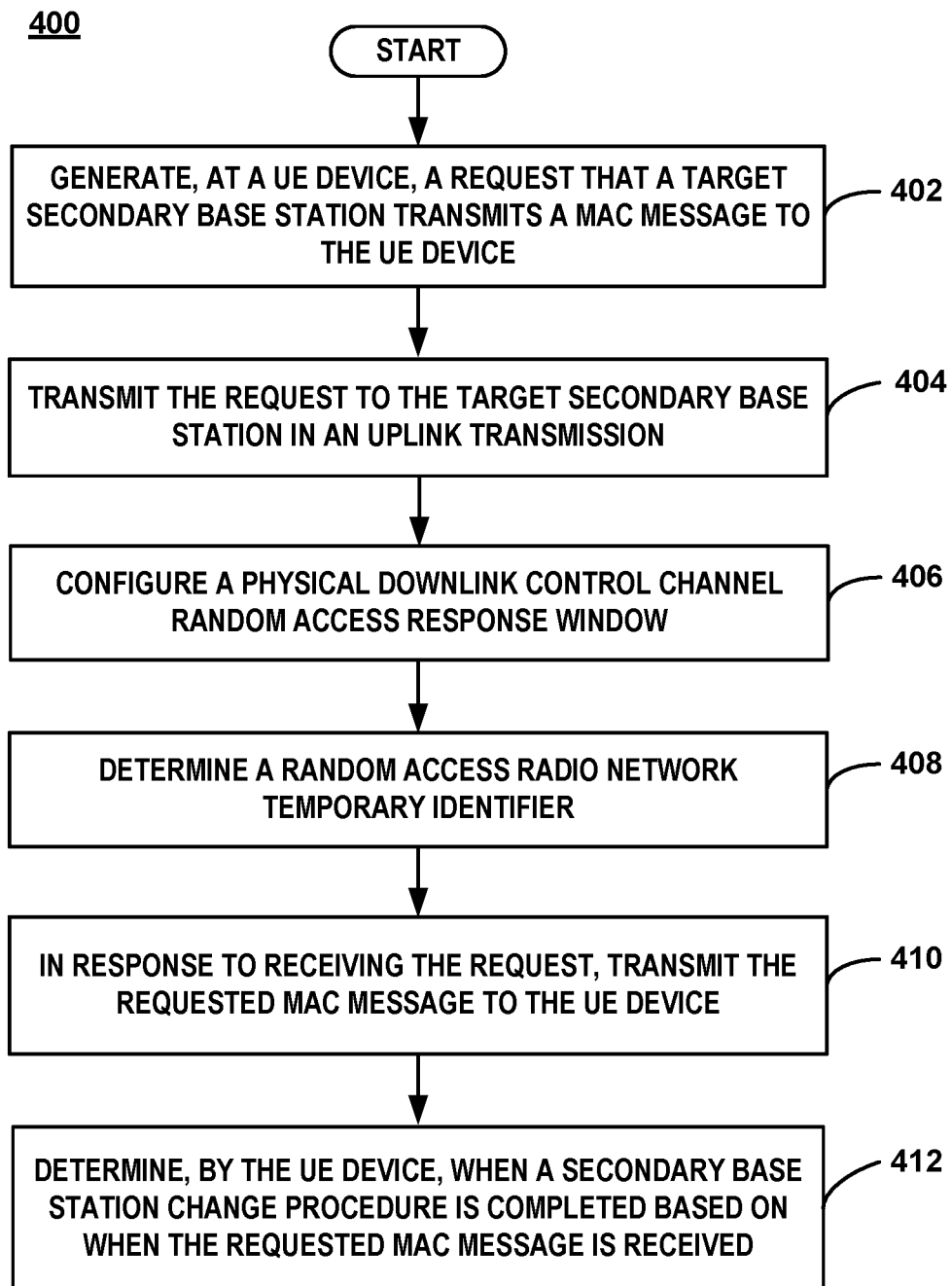
FIG. 4 is a flowchart of an example of a method in which a UE device requests that a target secondary base station transmits a MAC message to the UE device.

FIG. 4 is a flowchart of an example of a method in which a UE device requests that a Target SeNB transmits a MAC message to the UE device. The steps of method 400 may be performed in a different order than described herein and shown in the example of FIG. 4. Furthermore, in some examples, one or more of the steps may be omitted. Moreover, in other examples, one or more additional steps may be added.

The method 400 begins at step 402 with generating, at UE device 106, a request that Target SeNB 105 is to transmit, to the UE device 106, a specific MAC message. At step 404, the UE device 106 transmits the request to the Target SeNB 105 in an uplink transmission. At step 406, a Physical Downlink Control Channel (PDCCH) Random Access (RA) Response window is configured, and the UE device 106 monitors the PDCCH for the requested MAC message during the PDCCH RA Response window.

At step 408, the UE device 106 determines a Random Access Radio Network Temporary Identifier (RA-RNTI), which is used to confirm that the MAC message received from the Target SeNB 105 is intended for the UE device 106. At step 410, in response to receiving the request, the Target SeNB 105 generates the requested MAC message and transmits the requested MAC message to the UE device 106. At step 412, the UE device 106 determines when the SeNB Change procedure (e.g., from Source SeNB 104 to Target SeNB 105) is completed for the UE device 106, based at least partially upon when the UE device 106 receives the requested MAC message.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
transmitting, at a user equipment (UE) device, an uplink transmission to a Target Secondary base station while the UE device is connected to a Master base station and a Source Secondary base station; and
receiving, at the UE device, a UE Contention Resolution Identity Media Access Control (MAC) control element from the Target Secondary base station in response to transmitting the uplink transmission; wherein a Secondary base station Change procedure is completed for the UE device when the UE device receives the UE Contention Resolution Identity MAC control element, the Secondary base station Change procedure not including transmission of Random Access Channel (RACH) from the UE device to the Target Secondary base station, the Secondary base station Change procedure not including transmission of a preamble from the UE device to the Target Secondary base station.

2. The method of claim 1, further comprising:
receiving, at the Target Secondary base station, a Secondary Base Station Reconfiguration Complete message from the Master base station, wherein
the uplink transmission is transmitted after the Secondary Base Station Reconfiguration Complete message is received at the Target Secondary base station.

3. The method of claim 1, further comprising:
receiving, at the UE device, a Radio Resource Control (RRC) Connection Reconfiguration message from the Master base station, the RRC Connection Reconfiguration message including uplink grant information, wherein
the uplink transmission is transmitted based on the uplink grant information.

4. A user equipment (UE) device comprising:
a transmitter configured to transmit an uplink transmission to a Target Secondary base station while the UE device is connected to a Master base station and a Source Secondary base station; and
a receiver configured to receive a UE contention Resolution Identity Media Access Control (MAC) control element from the Target Secondary base station in response to transmitting the uplink transmission, wherein a Secondary base station Change procedure is completed for the UE device when the receiver receives the UE Contention Resolution Identity MAC control element, the Secondary base station Change procedure not including transmission of Random Access Channel (RACH) from the transmitter to the Target Secondary base station, the Secondary base station Change procedure not including transmission of a preamble from the transmitter to the Target Secondary base station.

5. A processer for a user equipment (UE) device comprising:
a memory configured to store at least a program, wherein the at least a program comprises:
a first process to make the UE device transmit an uplink transmission to a Target Secondary base station while the UE device is connected to a Master base station and a Source Secondary base station; and
a second process to make the UE device receive a UE Contention Resolution Identity Media Access Control (MAC) control element from the Target Secondary base station in response to transmitting the uplink transmission, wherein a Secondary base station Change procedure is completed for the UE device when the UE device receives the UE Contention Resolution Identity MAC control element, the Secondary base station Change procedure not including transmission of Random Access Channel (RACH) from the UE device to the Target Secondary base station, the Secondary base station Change procedure not including transmission of a preamble from the UE device to the Target Secondary base station.

6. A Target Secondary base station comprising:
a receiver configured to receive an uplink transmission from a user equipment (UE) device connected to a Master base station and a Source Secondary base station; and
a transmitter configured to transmit a UE Contention Resolution Identity Media Access Control (MAC) control element to the UE device in response to receiving the uplink transmission, wherein a Secondary base station Change procedure is completed for the UE device when the UE device receives the UE Contention Resolution Identity MAC control element, the Secondary base station Change procedure not including reception of Random Access Channel (RACH) by the receiver from the UE device, the Secondary base station Change procedure not including reception of a preamble by the receiver from the UE device.

* * * * *